United States Patent [19]
Lombard

[11] Patent Number: 5,320,793
[45] Date of Patent: Jun. 14, 1994

[54] PROCESS FOR MANUFACTURING AN EXTRUDED AND CUT PRODUCT CONTAINING MATERIAL NOT SUITED TO BE SEVERED

[76] Inventor: Marco H. Lombard, 1704 Thousand Oaks Cir., Austin, Tex. 78746

[21] Appl. No.: 14,835

[22] Filed: Feb. 8, 1993

Related U.S. Application Data

[62] Division of Ser. No. 786,247, Oct. 3, 1991, Pat. No. 5,209,156.

[51] Int. Cl.5 ............................................. B29B 11/02
[52] U.S. Cl. .................................. 264/141; 264/142; 264/148; 264/172; 425/132; 425/145; 425/308; 426/516
[58] Field of Search ............... 264/167, 172, 142, 141, 264/140, 148; 425/132, 133.1, 308, 145; 426/516

[56] References Cited

U.S. PATENT DOCUMENTS

| | | | |
|---|---|---|---|
| 3,049,397 | 8/1962 | O'Shaughnessy | 264/167 |
| 3,608,013 | 9/1971 | Ingham | 425/132 |
| 4,113,890 | 9/1978 | Long | 264/172 |
| 4,151,251 | 4/1979 | Kropa | 264/142 |
| 4,659,580 | 4/1987 | Svengren | 425/132 |
| 4,828,780 | 5/1989 | Luker | 425/132 |
| 4,876,052 | 10/1989 | Yamada et al. | 264/172 |

*Primary Examiner*—Jeffery Thurlow

[57] ABSTRACT

A process for manufacturing extruded and cut products (70) containing a first material (20), resistant to being severed or sensitive to being severed, and an easily severed second material (16). Includes an extruder apparatus (10) with a first conduit (14) disposed to accept the first material, and a second conduit (18) disposed to accept the second material. And diverter cylinders (22) and (24), opening into the conduits to cyclicly extract or inject the materials from the conduits, producing intermittent flows within the conduits (14) and (18) out of phase of each other, next the materials alternately fill a transverse section of a confluence (42) to form a transversely layered extrusion (35). A conventional cutter is timed to transversely sever the transversely layered extrusion when a transverse layer of easily severed material (16) is exiting.

6 Claims, 5 Drawing Sheets

PROCESS FOR MANUFACTURING AN EXTRUDED AND CUT PRODUCT CONTAINING MATERIAL NOT SUITED TO BE SEVERED

BACKGROUND—FIELD OF THE INVENTION

This application is a division of Ser. No. 07/786,247, Oct. 31, 1991 U.S. Pat. No. 5,209,156.

The invention relates to the manufacture of extruded and cut products containing component material not suited to be severed, placed in selected areas within the envelope of the extruded and cut product during the extrusion process.

BACKGROUND—DESCRIPTION OF PRIOR ART

Prior art extrusion methods to isolate a component material from the severing device by including the component material in filling material which is then completely enclosed in a coating material, depend on converging flow terminators to affect the desired intermittent flow of the filling material. These converging flow terminating methods, in the act of terminating the flow of a filling material containing component material not suitable to be severed or resistant to being severed, such as capsules, spheres, or cubed meat, either damage the component material, or become jammed, or do not seal completely when attempting to close on to the component material, thus resulting in an unacceptable high product scrap rate. A prior art method which encloses an easily severed material, within another easily severed material using a converging flow terminator, is taught by Svengren in U.S. Pat. No. 4659580. Apr. 21, 1987

To circumvent the problems associated with including component material that is resistant to being severed or is sensitive to being severed within an extruded and cut product, conventional methods use subsequent methods to add the component material to the exterior of an extruded and cut base of uniform consistency thus suffer from a number of disadvantages:

(a) The subsequent attaching of component material to the exterior of an extruded and cut base, either requires manual labor introducing quality variations, or costly devices that take up considerable space, and are correspondingly expensive to maintain.

(B) Attaching the component material to the surface of an extruded and cut base, does because of its nature, expose the component material to the elements, thus as in the case of a dough product with cubed meat as the component material, precludes subsequent sanitary cooking and packaging of the product.

(C) Attaching the component material to the surface of an extruded and cut base can expose the product to the entrapment air-borne pathogens due to the successive layering of ingredients as the product progresses forward by conveyor from one station to another.

(D) Attaching the component material to the surface of an extruded and cut base usually depends on uniform, dry, and non-sticky component material, thus limiting the materials and products compatible with the process.

OBJECTS AND ADVANTAGES

Accordingly several objects and advantages of this invention are:

(a) To provide a process for producing extruded and cut products which contain component material that resist being severed, or may be sensitive to being severed, within the envelope of the extruded and cut product.

(B) To provide a process for placement of component material not suited to be severed within an extruded and cut product but not in the area traversed by the cutter mechanism in the process of segmenting the extrusion into extruded and cut pieces.

(C) To provide a process for producing an extruded and cut product containing component material not suitable to being severed, or may be sensitive to being severed, wherein the extruded and cut product has smooth surfaces suitable for accepting subsequent applied lettering, decorations or designs thereon.

(D) To provide a process for producing extruded and cut products containing component material sensitive to being severed, or other ingredients, without inflicting damage to the component material in the process of extruding and cutting the extrusion into individual segments.

(E) To provide a process without converging parts, for converting a flow of a material in a conduit, to an intermittent flow downstream in the conduit, and particularly adaptable to the manufacture of extruded and cut multi-ingredient products containing component material resistant to being severed, or that may be sensitive to being severed.

Further objects and advantages are to provide an extrusion process with the flexibility to produce novel multi-ingredient extruded and cut products such as; pills within caplets, or metal spheres within plastics, for the pharmaceutical, medical plastics, and other industries.

Other objects will become apparent from a consideration of the ensuing description and drawing.

SUMMARY OF THE INVENTION

The invention provides a diverter valving process to circumvent the cutting action converging flow terminating devices have on component materials that resist being severed or are sensitive to being severed, when the component materials are caught by the converging flow terminating devices during the flow terminating cycle in the manufacture of multy-ingredient extruded products. And in particular the invention provides a process for producing extruded and cut products which contain within the envelope of the products, component materials that resist being severed, or are sensitive to being severed.

Figure 1:
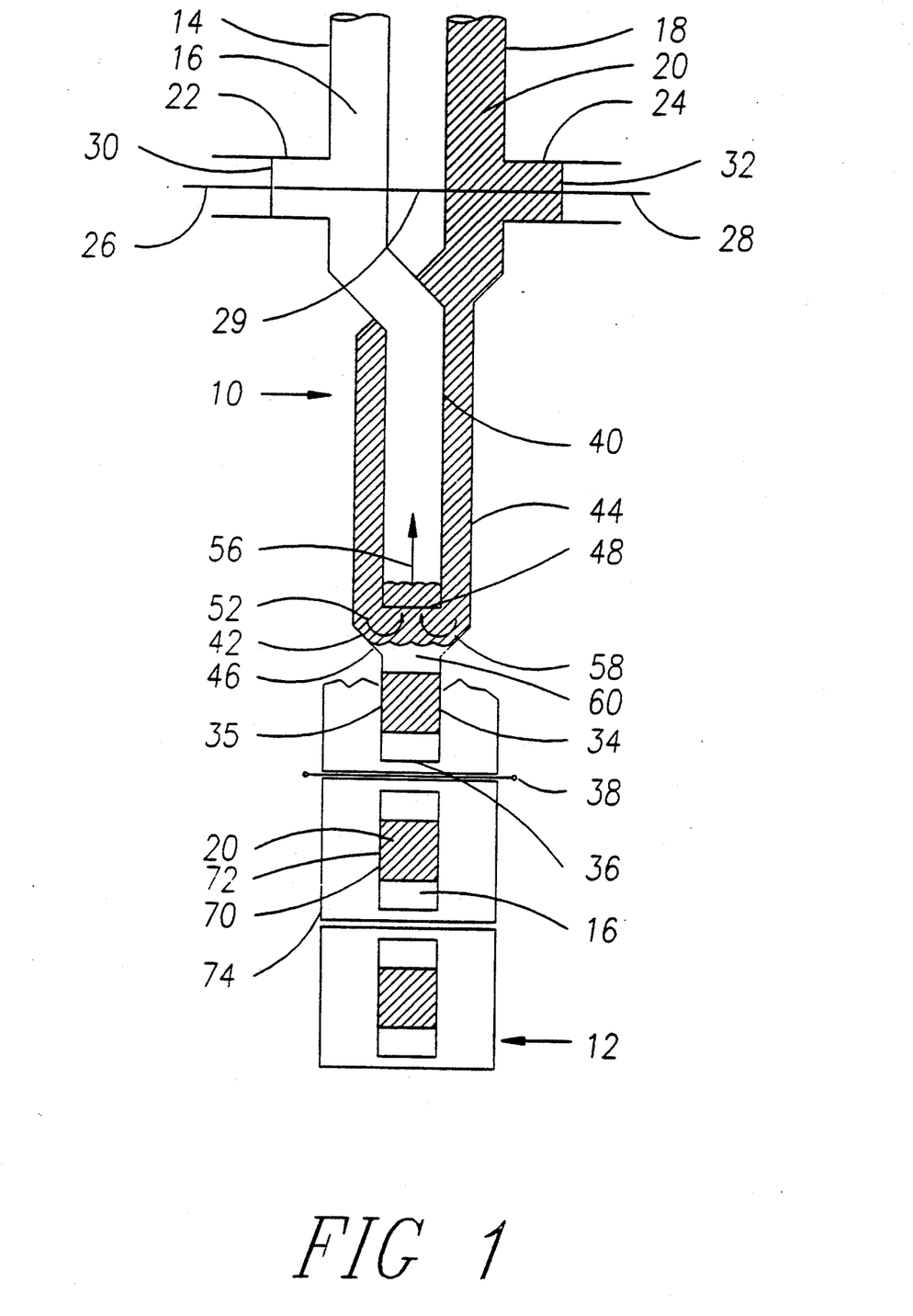
FIG. 1 is a schematic sectional top view of an extruder apparatus according to the present invention for producing multi-ingredient extruded and cut products.

DESCRIPTION—FIG. 1

A typical embodiment of the process of the present invention is illustrated in FIG. 1 in which there is shown a schematic sectional top view of an extruder apparatus 10 situated over a conveyor 12. A first conduit 18 and a second conduit 14 are each disposed to accept a flow of material from conventional sources. Downstream and forming an opening into the first conduit 18 is a first diverter cylinder 24 which is provided with a piston 32 driven by a piston rod 28, and forming an opening into the second conduit 14 is a second diverter cylinder 22 which is provided with a piston 30 driven by a piston rod 26. Both piston rods 26 and 28 are disposed and adaptable to be driven by conventional methods such as an air cylinder or a cam driven by a variable speed motor. The diverter cylinders are disposed onto their respective conduits to enable the extraction or injection of material into or out of their respective conduits.

Downstream from the diverter cylinders the two separate conduits 14 and 18 join coaxially such that one conduit 14 forms an inner conduit 40 and the other conduit 18 forms an outer conduit 44 of extruder apparatus 10.

To simplify this explanation, and to maintain an even flow speed, inner conduit 40 and outer conduit 44 have the same cross sectional area. The outer conduit 44 extends past the end of inner conduit 40 to form a confluence 42 of the inner and the outer conduits. Further down stream and depending on the product configuration, the confluence 42 may have a reduced cross sectional area 46 to provide a transition into a common extruder spout 34 with a die end 36. A conventional cutter mechanism 38 is situated to sever the extrusion at die end 36 of extruder spout 34.

Figure 2:
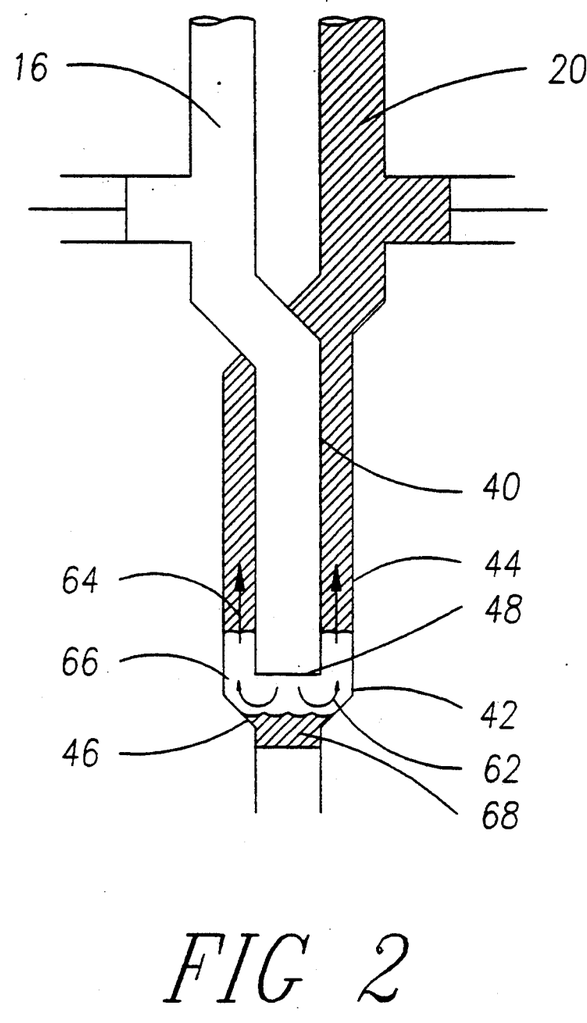
FIG. 2 is a partial sectional top view of the apparatus shown in FIG. 1.

OPERATION—FIGS. 1 AND 2

The operation of the extruder is illustrated in FIGS. 1 and 2 in which, for descriptive purposes, the commencement of the cycle is shown in FIG. 1, where separate materials are introduced from conventional sources to the conduits 14 and 18 of extruder apparatus 10. For example conduit 18 could be for the introduction of component material 20 which is resistant to being severed, or sensitive to being severed, such as capsules, spheres, cubes, or other material, alone or in a filling material carrier, at a first flow, which for this description is a constant controlled input volume of (XL.P.M.), that is, (X LITERS PER (M)), and conduit 14 could be for the introduction of easily severed material 16 at a second flow, which for this description is a constant controlled input volume of (XL.P.M.), that is, (X LITERS PER (M)). Piston rod 26 and piston rod 28 are driven by conventional mechanical or other method and synchronized to the motion of conveyor 12 and cutter 38 by conventional methods. The action of the diverter cylinders is such that while diverter cylinder 22 extracts material 16 from its connecting conduit 14 by the action of piston rod 26 driving piston 30, diverter cylinder 24 injects material 20 into its connecting conduit 18 by the action of piston rod 28 driving piston 32. Likewise when diverter cylinder 22 injects material 16, diverter cylinder 24 extracts material 20. The diverter cylinders operate out of phase of each other such that piston rod 26 and piston rod 28 could be one piston rod 29, however for greater product adjustability, separate piston rods are shown in this description.

Each of the diverter cylinders 22 and 24 is adjusted, by altering the stroke and velocity of piston rod 26 and piston rod 28 by conventional methods to accommodate a volume per given time equal to the first flow into the first conduit (XL.P.M.) plus an extra amount (YL.P.M.), for a total of (X+YL.P.M.) for each of the diverter cylinders wherein:

M=(30/V) the tentative time in seconds required to produce one transverse layer of material in the confluence 42 when the conveyor 12 moves at a rate of (V) plates per minute.

X=a volume in liters per (M) introduced to each conduit and determined by the volume of the desired product.

Y=a volume percentage of (X), relating to a material's resistance to separate when pulled apart. The value of (Y) must be determined empiricly by the practitioner in the process of setting up the product and its parameters. Generally the value for (Y) can be lower for a material which separates easily and or contains small particulates, and higher for sticky, difficult-to-separate material and or containing large particulates.

When a diverter cylinder is in the injection part of its cycle, the net flow down stream in its system of the extruder apparatus is; the controlled input rate from the source, plus the volume the diverter cylinder is injecting, which is:

$$(XL.P.M.)+(X+YL.P.M.)=(2X+YL.P.M.)$$

In other words, while a diverter cylinder is injecting material the flow down stream in its system of the extruder apparatus more than doubles, if the value for (Y) is greater than zero.

Conversely while a diverter cylinder is in the extracting part of its cycle, the net flow downstream in its system of the extruder apparatus is the controlled input rate from the source, minus the volume the diverter cylinder is extracting, which is:

$$(XL.P.M.)-(X+YL.P.M.)=(-YL.P.M.)$$

In other words, while a diverter cylinder is in the extracting part of its cycle, the flow of material down stream in its system of the extruder apparatus may be reversed and may momentarily flow backward, if the value for (Y) is greater than zero.

Some materials may separate sufficiently without resorting to flow reversal, however many materials will require some degree of flow reversal to positively separate, the flow reversal being induced by the difference in rate between the controlled input rate from the source (XL.P.M.) and the volume the diverter cylinder is extracting (X+YL.P.M.) the difference being (−YL.P.M.). the value (Y) determining the magnitude of backward flow.

The momentary flow reversal in the inner conduit 40 coincides with the momentary flow increase in outer conduit 44, this action is translated to that portion of the extruder apparatus where inner conduit 40 ends 48, such that;

when diverter cylinder 22 is extracting material, the momentary flow reversal occurs in inner conduit 40 inducing a momentary pressure drop in inner conduit 40 while concurrently diverter cylinder 24 is injecting material thereby inducing a momentary pressure increase in outer conduit 44. The boundary of pressure differential occurs at end 48 of inner conduit 40. This pressure differential causes material 20 in outer conduit 44 with the higher pressure to exert a radial sphincter-like force 52 on the lower pressure material 16 of inner conduit 40, while material 16 of inner conduit 40 with lower pressure and reverse flow, exerts a rearward pulling force 56 on material 16 in inner conduit 40, the combination of forces enable material 20 to intrude into conduit 40 sufficiently as determined by the value (y) to assure the momentary filling of a transverse section 58 of the confluence 42 exclusively with material 20 from outer conduit 44, thus positively separating material 16 of inner conduit 40 from its parent material 60, swept down stream.

Conversely when the momentary flow reversal is in outer conduit 44, ( REFERRING NOW TO FIG. 2 ) there is a momentary pressure drop in outer conduit 44 and a momentary pressure increase in inner conduit 40. The boundary of pressure differential occurs at end 48 of inner conduit 40, this pressure differential causes material 16 in inner conduit 40 with its higher pressure to exert a ballooning like pushing force 62 on the lower pressure material 20 in outer conduit 44, while material 20 in outer conduit 44 with its lower pressure and reverse flow exerts a pulling force 64 on material 20 in outer conduit 44. The combination of forces enable material 16 to intrude into conduit 44 sufficiently as determined by the value (y) to assure the momentary filling of a transverse section 66 of the confluence 42 exclusively with material 16 from inner conduit 40 thereby positively separating material 20 in outer conduit 44 from its parent material 68 swept downstream.

Since the complimentary action of the diverter cylinders cancel each other, (REFERRING NOW TO FIG. 1) the net flow out of extrusion die 36 remains a constant (2XL.P.M.); however the extrusion has become transversely layered 35 due to the cycling action of the diverter cylinders, half of the time the material extruded is free of component material 20 and half of the time the material extruded contains component material 20.

Cutter 38 is timed by conventional methods to cut thru the extrusion when extruded material is exiting the die end 36 of extruder spout 34 at a time when the transversely layered material is free of component material 20 thus providing an extruded and cut product 70 with cut ends of easily severed material 16 and containing a transverse layer 72 of the component material 20.

The customary separation and centering of the extruded and cut product 70 on the conveyor plates 74 is achieved by conventionally oscillating extruder apparatus 10 by conventional methods timed and adjusted by conventional methods to conveyor 12. The product could then be transported for further processing and or packaging.

Although diverter cylinder 24 and diverter cylinder 22 when operating out of phase of each other provide complete transverse layers of material 20 and then of material 16 alternately, it should be understood that the use of a single diverter cylinder 24 is sufficient to produce an acceptable product wherein material 20 separates easily or in products were complete transverse layers of material 20 are not necessary or desirable. Therefore, varying the expressions in the relation (X+YL.P.M.), and or varying the input volumes into inlet conduits 14 and 18, and or disabling one of the diverter cylinders, will provide a variety of different and programmable product configurations.

Figure 3:
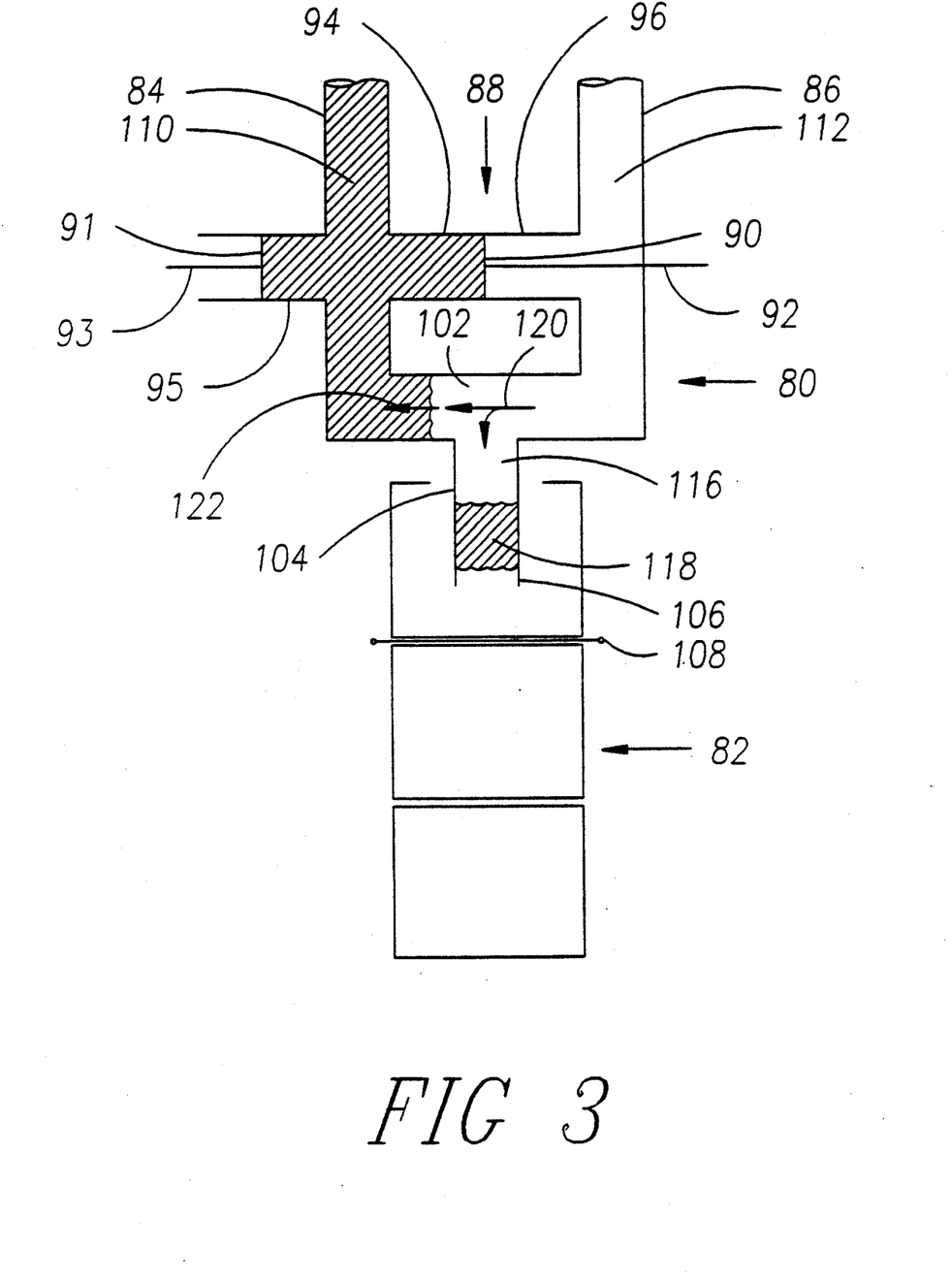
FIG. 3 is a schematic view of an extruder apparatus according to the present invention for producing transversely layered extruded and cut products.

DESCRIPTION—FIG. 3

A preferred embodiment of the present invention, for producing transversely layered extruded and cut product is illustrated in FIG. 3 in which there is shown a schematic sectional view of an extruder apparatus 80 situated over a conveyor 82. A first conduit 84 is disposed to accept a first flow of a first material 110 from conventional sources, and a second conduit 86, is disposed to accept a second flow of a second material 112 from conventional sources.

Downstream, and forming an opening into and joining conduits 84 and 86, is a cylinder 88 which is provided with a piston 90 that is driven by a piston rod 92. Piston 90 is disposed in cylinder 88 to act as a moving boundary in cylinder 88 and thus segmenting cylinder 88 into a diverter cylinder 94 and a diverter cylinder 96. Piston rod 92 is disposed and adaptable to be driven by conventional methods such as an adjustable air cylinder or a cam driven by a variable speed motor timed and adjusted to conveyor 82 by conventional methods.

Diverter cylinder 94 is disposed onto the first conduit 84 to enable the extraction or injection of the first material 110 from the first conduit 84 to form a first intermittent flow, and diverter cylinder 96 is disposed onto the second conduit 86 to enable the extraction or injection of the second material 112 into or out of the second conduit 86 to form a second intermittent flow. Further downstream from the diverter cylinders the two separate conduits 84 and 86 join to form a confluence 102 which forms into a common extruder spout 104 with a die end 106.

A conventional cutter 108, is situated to sever the extrusion at die end 106 of extruder spout 104.

Figure 4:
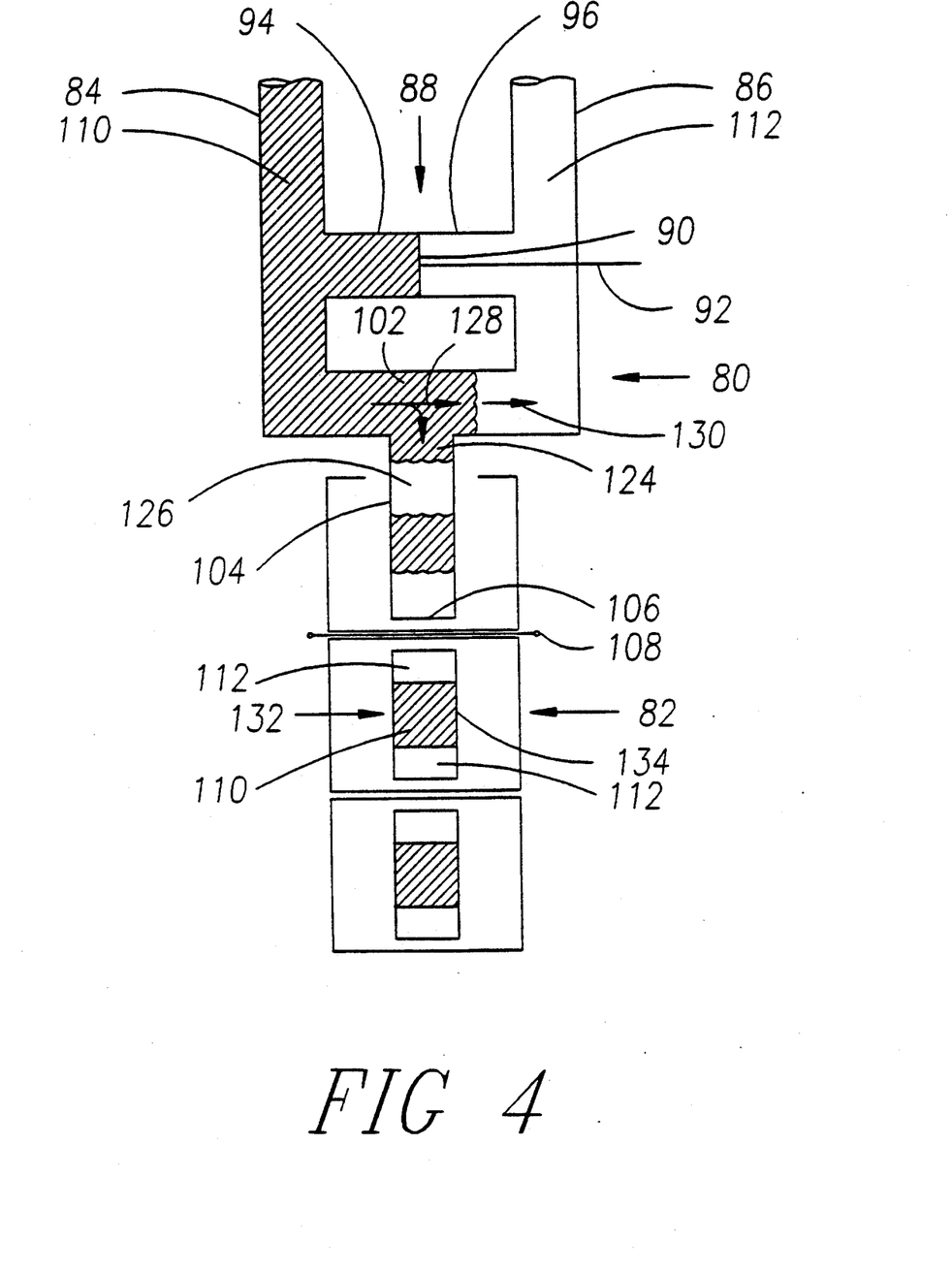
FIG. 4 is a partial sectional view of the apparatus shown in FIG. 3.

OPERATION—FIGS. 3 AND 4

The operation of the extruder apparatus is illustrated in FIGS. 3 and 4 in which, for descriptive purposes, the commencement of the cycle is shown in FIG. 3, where from conventional sources, two separate materials and flows are introduced to the extruder apparatus, the first flow to the first conduit 84, and the second flow to the second conduit 86. To simplify the description, the first flow and the second flow in this description are equal and constant controlled input volumes of (XL.P.M.) each, to each of the separate conduits 84 and 86 of extruder apparatus 80. For example; the first conduit 84 could be for the introduction of a first material, containing component material 110 which is resistant to being severed, or sensitive to being severed, and is introduced at a first flow, which in this description is (XL.P.M.), and the second conduit 86 could be for the introduction of an easily severed second material 112 and is introduced at a second flow, which in this description is (XL.P.M.).

piston rod 92 is driven by conventional methods and timed to conveyor 82 and cutter 108 by conventional methods.

The diverter cylinders are out of phase with each other, therefore, when diverter cylinder 94 extracts material 110 by the action of piston rod 92 driving piston 90, diverter cylinder 96 injects material 112. Likewise when diverter cylinder 94 injects material 110, diverter cylinder 96 extracts material 112.

The diverter cylinders 94 and 96 are adjusted by altering the stroke and velocity of piston rod 92 by conventional methods to accommodate a volume per given time equal to the first flow into the first conduit (XL.P.M.), plus an extra amount (YL.P.M.), for a total of (X+YL.P.M.) for each of the diverter cylinders wherein:

$M = (30/V)$ is the tentative time in seconds required to produce one transverse layer of material in the confluence 102 when the conveyor 82 moves at a rate of (v) plates per minute.

X = a volume in liters per (M) introduced to the conduit and determined by the volume of the desired product.

Y = a volume, usually a percentage of (X), relating to a material's resistance to separate when pulled apart. In practice the value (Y) must be determined empiricly by the practitioner in the process of setting up the product and its parameters. Generally the value (Y) can be lower for a material which separates easily and or contains small particulates, and higher for sticky, difficult-to-separate material and or containing large particulates.

When a diverter cylinder is in the injecting part of its cycle, the net flow down stream in its system of the extruder apparatus is;

The controlled input rate from the conventional source, plus the volume the diverter cylinder is injecting, which is:

$$(XL.P.M.) + (X + YL.P.M.) = (2X + YL.P.M.).$$

In other words while a diverter cylinder is injecting material, into a conduit, the flow down stream, in it's system of the extruder apparatus, more than doubles when the variable (Y) is greater than zero.

Conversely while a diverter cylinder is extracting material, from a conduit, the net flow downstream in its system of the extruder apparatus is;

the controlled input rate from the conventional source, minus the volume the diverter cylinder is extracting, which is:

$$(XL.P.M.) - (X + YL.P.M.) = (- YL.P.M.).$$

In other words, while a diverter cylinder is extracting material, the flow of material down stream in its system of the extruder apparatus is reversed and momentarily flows backwards. The flow reversal is induced by the difference in rate between the controlled input rate from the blender (XL.P.M.) and the volume the diverter cylinder is extracting, (X+YL.P.M.) the difference being (−YL.P.M.), the value (Y) determines the magnitude of backward flow.

The momentary flow reversal in one conduit 84 coincides with the momentary flow increase in the other conduit 86 creating a pressure differential in that portion of the extruder apparatus where conduits 84 and 86 join to form a confluence 102 such that;

when diverter cylinder 94 is extracting material, the momentary flow reversal is in conduit 84, inducing a momentary pressure drop in conduit 84 and concurrently diverter cylinder 96 is injecting material, inducing a momentary pressure increase in conduit 86. The boundary of pressure differential occurs where conduits 84 and 86 join to form the confluence 102. This pressure differential causes material 112 in conduit 86 with the higher pressure to exert a pushing force 120 on the lower pressure material 110 in conduit 84, while material 110 in conduit 84 with the lower pressure and reverse flow exerts a backward pulling force 122 on material 110 in conduit 84 forcing material 110 in conduit 84 backwards and away from the confluence 102 and far enough backwards determined by the value (Y) to assure that none of material 110 from conduit 84 remains in a transverse section 116 of the confluence 102, therefore momentarily filling a transverse section 116 of the confluence 102 exclusively with material 112 from conduit 86, and positively separating material 110 of conduit 84 from its parent material 118 swept down stream.

Conversely when the momentary flow reversal is in conduit 86 induced by diverter cylinder 96 extracting material while diverter cylinder 94 is injecting material ( REFERRING NOW TO FIG. 4 ) there is a momentary pressure drop in conduit 86 and a momentary pressure increase in conduit 84. The boundary of pressure differential occurs where conduits 84 and 86 join to form the confluence 102. This pressure differential causes material 110 in conduit 84 with its higher pressure to exert a pushing force 128 on the lower pressure material 112 in conduit 86, while material 112 in conduit 86 with its lower pressure and reverse flow exerts a backward pulling force 130 on the material 112 in conduit 86 forcing material 112 in conduit 86 backwards and away from the confluence 102 and far enough backwards determined by the value (Y) to assure that none of the material 112 in conduit 86 remains in a transverse section 124 of the confluence 102, therefore momentarily filling transverse section 124 of the confluence 102 exclusively with material 110 from conduit 84 and positively separating material 112 in conduit 86 from its parent material 126 swept downstream.

Since the complimentary action of the diverter cylinders cancel each other, the net flow out of extrusion die 106 remains a constant (2XL.P.M.), the extruded material is however transversely layered due to the cycling action of the diverter cylinders, half of the time the material extruded will be free of component material 110, and half of the time the material extruded will contain component material 110.

Cutter 108 is timed by conventional methods to cut through the extrusion when extruded material exiting die end 106 of extruder spout 104 is free of component material 110, thus providing an extruded and cut product 132 with cut ends of easily severed material 112 and containing a transverse layer 134 containing component material 110 not suited to be severed. The customary separation and centering of the extruded and cut product 132 on the conveyor 82 is achieved by oscillating extruder apparatus 80 by conventional methods timed and adjusted by conventional methods to conveyor 82. The product is then normally conveyed by conventional conveyor 82 for further processing and or packaging.

For greater control of the transverse layers forming in the confluence 102, (REFERRING NOW TO FIG. 3), an extra diverter cylinder, such as diverter cylinder 95 with piston 91 and piston rod 93 driven by suitable conventional methods, can be added to either or both conduits, thus providing a more flexible way of altering the value for (Y) when setting up the parameters for a new product.

Figure 5:
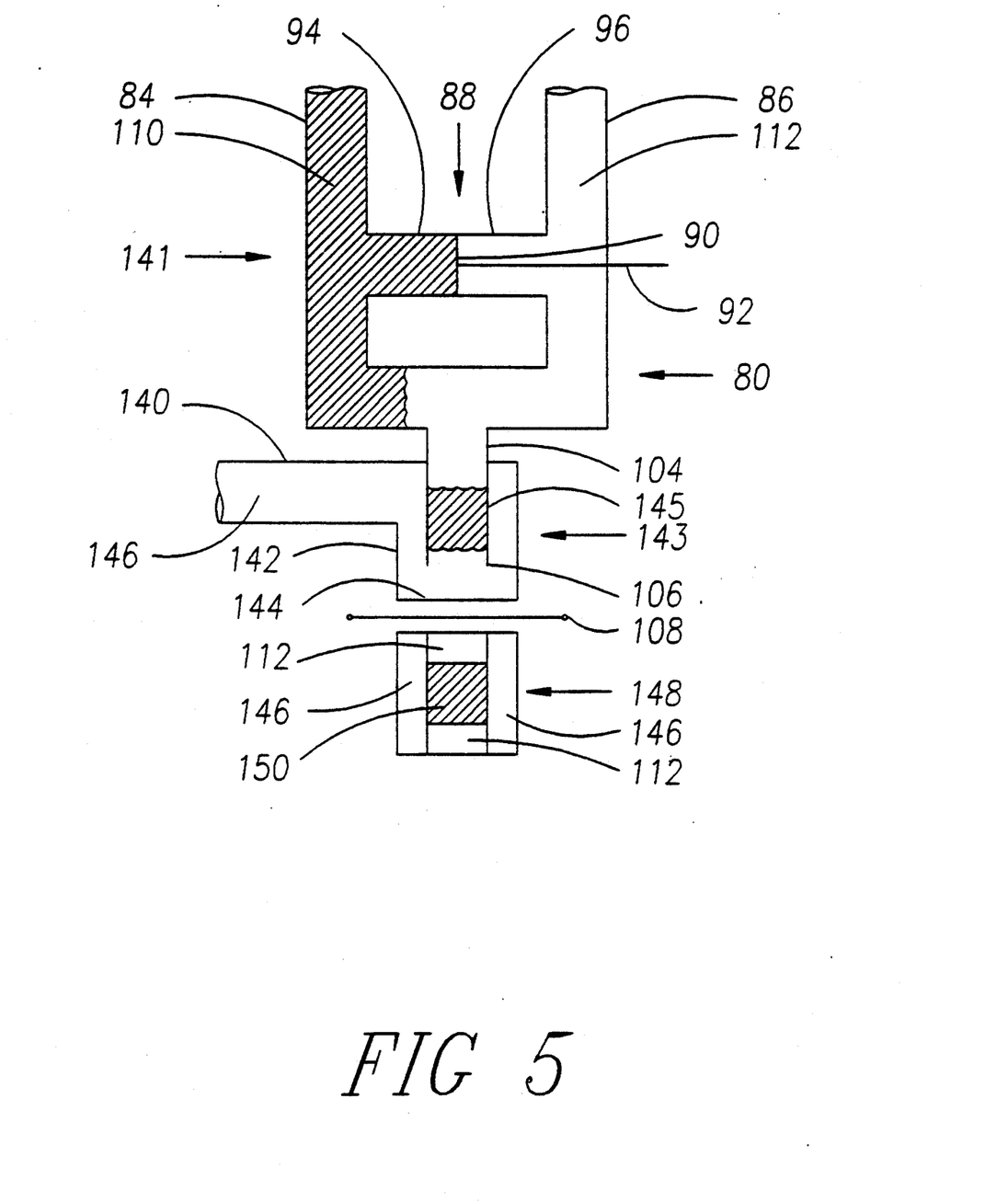
FIG. 5 is a schematic view of an extruder apparatus according to the present invention, for producing extruded and cut products containing a transversely layered filling material sleeved with a coating material.

DESCRIPTION—FIG. 5

Another preferred embodiment of the present invention is an apparatus for producing extruded and cut products, in which one material sleeves another material, is illustrated in FIG. 5 wherein a common extruder apparatus 141 is composed of an extruder apparatus 80 producing alternating transverse layers of material 110 and 112 as described in the description and operation of FIG. 3 and 4, has a third conduit 140 disposed to join extruder spout 104 of extruder apparatus 80 coaxially, such that extruder spout 104 forms the inner conduit 145 and the third conduit 140 forms the outer conduit 142 of a common extruder spout 143. The outer conduit 142 has a die end 144 at its terminus, which is disposed downstream from the die end 106 of the inner conduit 145. A conventional cutter mechanism 108 is timed by conventional methods and is disposed to sever the extrusion as it exits from the common extruder spout 143 at the die end 144.

OPERATION—FIG. 5

The operation of the common extruder apparatus 141 is illustrated in FIG. 5, where from conventional sources, separate materials are introduced at a constant controlled input volume of (XL.P.M.), that is, (X LITERS PER MINUTE), to separate inlet conduits 84 and 86 of extruder apparatus 80 of the common extruder apparatus 141. For example the first conduit 84 could be for the introduction of a first material containing component material 110 at (XL.P.M.), and the second conduit 86 could be for the introduction of an easily severed second material 112 at (XL.P.M.). In addition, from a conventional source, an easily severed material 146 is introduced at a controlled input volume into the third conduit 140 of the common extruder apparatus 141. The input volume into conduit 140 is adjusted and set to allow material in the outer conduit 142 to exit at the same velocity as material in the inner conduit 145 of the common extruder spout 143.

A conventional cutter 108 is timed and adjusted by conventional methods to sever the extrusion when the extruded material exiting the die end 144 is the second material 112, thus providing an extruded and cut product 148 with cut ends of easily severed materials 146 and 112, and containing an encapsulate 150 comprised of component material 110 resistant to being severed or sensitive to being severed.

In this specification a piston method is described for diverting flow in the conduits, however other methods such as diaphragms, inflatable bladders, or peristaltic tubes could also be used successfully, therefore while preferred embodiments of the present invention have been disclosed, it will be understood that it is not limited thereto but may be otherwise embodied within the scope of the following claims.

What is claimed is:

1. A process for manufacturing an extruded and cut product, the process comprising the steps of:
    (a) directing a first extrudable material through a first conduit at a first flow rate in a direction toward an output end of the first conduit;
    (b) directing a second extrudable material through a second conduit at a second flow rate in a direction toward an output end of the second conduit;
    (c) directing the first material and the second material into a common extruder conduit connected to the first and second cnoduits at their respective output end;
    (d) intermittently extracting the first material for a first extracting period from the first conduit at a rate greater than the first flow rate, thereby causing the second material to flow into the first conduit at the outlet end thereof and allowing only the second material from the second conduit to enter the common extruder conduit to form a substantially discrete layer of the second material in the common extruder conduit during the first extracting periods; and
    (e) severing the discrete layer of second material formed in the common extruder conduit in a direction transverse to the common extruder conduit to form segments of material comprising the first and second materials.

2. The process of claim 1 further including the step of:
    (a) increasing the flow rate of the second material through the second conduit during the first extracting periods.

3. The process of claim 1 further including the step of:
    (a) intermittently and between first extracting periods, extracting the second material for a second extracting period from the second conduit at a rate greater than the second flow rate, thereby causing the first material to flow into the second conduit at the outlet end thereof and allowing only the first material from the first conduit to enter the common extruder conduit to form a substantially discrete layer of the first material in the common extruder conduit during the second extracting periods.

4. The process of claim 1 wherein the first flow rate is substantially equal to the second flow rate.

5. The process of claim 1 wherein the second flow rate is greater than the first flow rate.

6. The process of claim 1 further including the step of:
    (a) continuously directing a layer of sleeving material into the common extruder conduit so as to encase the first and second material in the common extruder conduit.

* * * * *